Nov. 13, 1928.
W. NOBLE ET AL
1,691,896
HYDRAULIC ACTUATING MEANS
Filed April 11, 1927    2 Sheets-Sheet 1
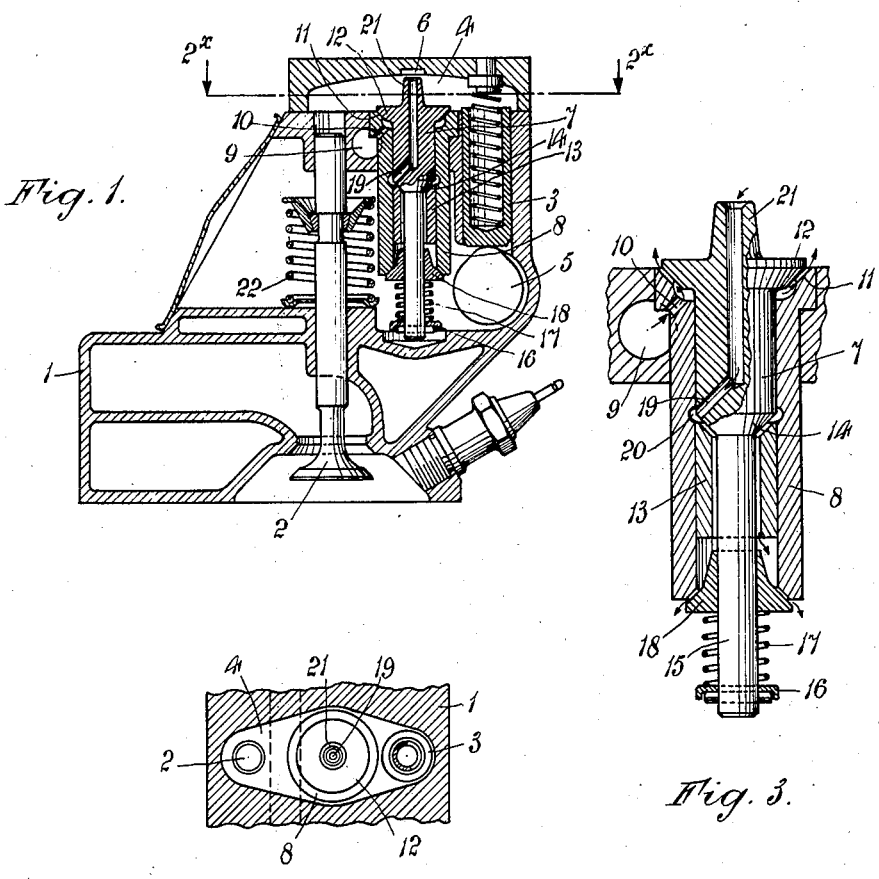

Patented Nov. 13, 1928.

1,691,896

UNITED STATES PATENT OFFICE.

WARREN NOBLE AND LEON V. PITTMAN, OF DETROIT, MICHIGAN; SAID PITTMAN ASSIGNOR TO SAID NOBLE.

HYDRAULIC ACTUATING MEANS.

Application filed April 11, 1927. Serial No. 182,667.

This invention relates to hydraulic actuating means, such as valve gears of the type described in the co-pending application of Warren Noble, Serial Number 180,119 filed the 28th day of March 1927, and our co-pending application Serial Number 183,710 filed the 14th day of April 1927, and has for its object to provide an automatic air bleed device in a hydraulic valve gear which may operate as a self-contained part of the single valve gear to permit the replenishing of oil therein and the scavenging of air therefrom during inactive periods of the said valve gear.

A further object of the invention is to provide means controlled by differential pressure in an oil feed manifold and in an actuator chamber containing the oil column of the valve gear or hydraulic actuating means, whereby, when the oil in the said actuator chamber is not under valve actuating pressure, the pressure of oil in said manifold will effect the operation of said means to permit flow from said manifold to said actuator chamber, and discharge flow from the point in said actuator chamber at which air would accumulate, so that such air will be discharged by said flow from the actuator chamber, and a replenishing of oil in the actuator chamber will take place during non-actuating periods.

Further, the invention contemplates the provision in a hydraulic actuating means such as a valve gear having a valve actuator oil chamber, of a combined oil inlet and relief valve having a relief passage extending from an air trap in said actuator chamber and adapted to operate as a check valve preventing inlet or relief flow to or from said chamber, when oil in said chamber is subjected to a valve actuating pressure, and to be opened by the pressure of feed oil to said chamber during other periods.

Still further objects are to provide for the maintaining of sufficient pressure in the actuator chamber during flow periods to ensure full replenishing of oil and scavenging of air therefrom, and to also provide for the checking of air flow, through the relief valve to the said actuator chamber, such as might interfere with the proper functioning of the hydraulic actuating means.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, we may provide a hydraulic valve gear having a valve operated by a plunger through the medium of an oil column trapped in an actuator chamber, a pressure oil manifold having an inlet to said chamber opened and closed by a valve normally seated for that purpose, and also seated to close a relief outlet from said chamber, which relief outlet leads from an air trap within the chamber. The said relief valve, when open, communicates with a passage closed by a spring-pressed check valve having light pressure on its seat so that, when the relief valve is open, pressure oil in the said manifold is free to pass into the said chamber and oil and entrained air to pass from the said chamber through the relief valve and its check valve under pressure derived from the oil in the manifold. The said relief valve is closed against pressure of oil in the manifold by a superior pressure of oil in the said actuator chamber, when the plunger is actuated to operate the engine valve.

The said invention is more particularly described and ascertained hereinafter, by way of example, having reference to the accompanying drawings, wherein:—

Figure 1 is a transverse section of a cylinder head, including a hydraulic valve gear embodying the said invention;

Figure 2 is a fragmentary horizontal section taken on the line $2^x$—$2^x$ of Figure 1;

Figure 3 is a sectional detail view of the relief valve of Figure 1 drawn to a larger scale, and shown in its open position.

Similar characters of reference indicate similar parts in the several figures of the drawings, and Figure 4 is drawn to a larger scale than the other figures of the drawings.

Figure 4:
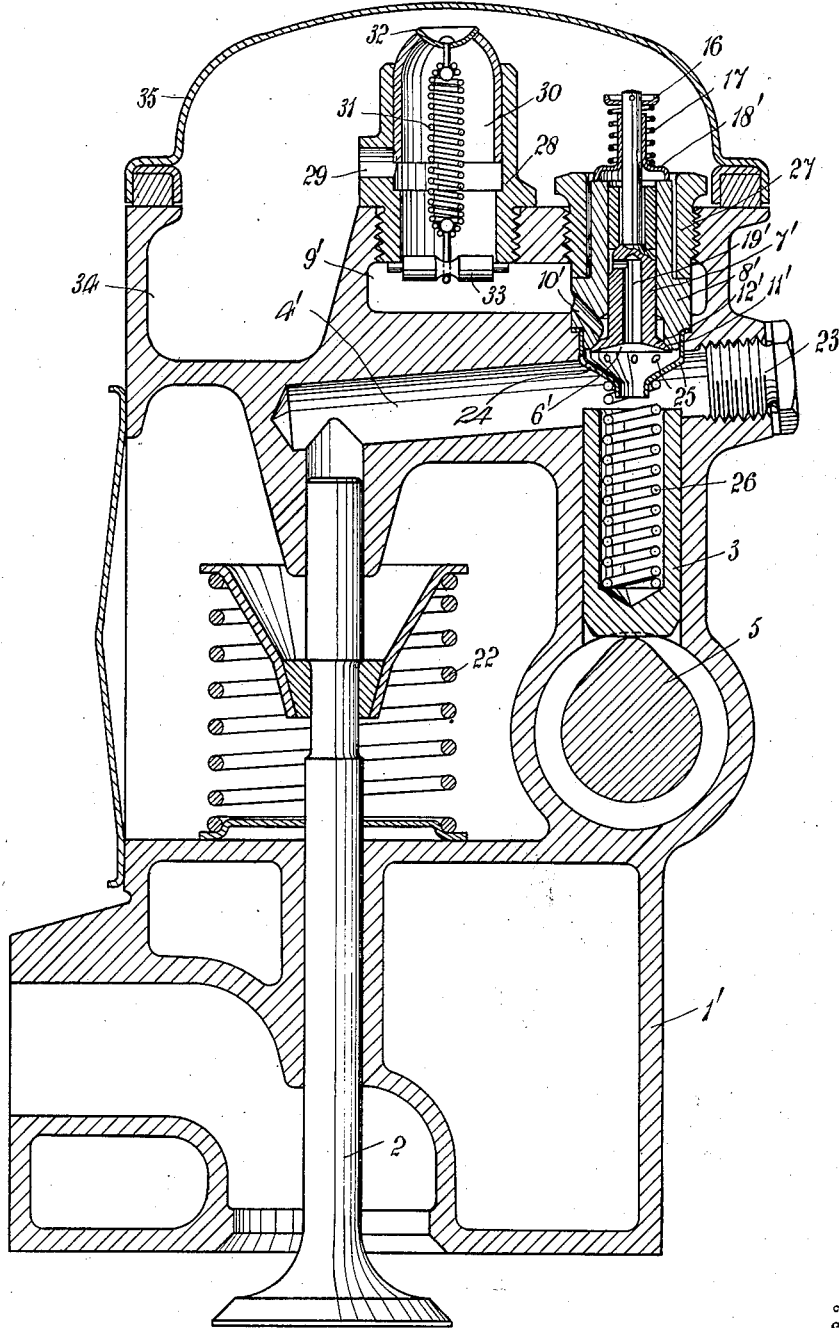
Figure 4 is a transverse section of another design of cylinder head, illustrating a modified form of the hydraulic gear.

A compact arrangement of cylinder head 1 and hydraulic valve gear is shown, wherein the engine valve 2 is operated by a plunger 3 through the medium of a column of oil in an actuator chamber 4,—5 being a cam effecting the operation of the said plunger 3.

Theoretically, a column of oil so enclosed between the plungers 3 and the stem of the valve 2 will, under all normal conditions, produce a correct translation of plunger movement into valve movement, but, in actual practice, the column of oil in the chamber 4 may become depleted to some extent such as by leakage or by the entraining of air when charging the chamber 4 with oil, and the presence of any air in the chamber reduces the lift of the valve to the extent of air compression which results in the chamber 4, this being especially apparent in connection with engines where high resistance to initial valve movement is met with.

The present invention provides a very simple and expedient means of ensuring the automatic scavenging of air from the chamber 4, and the replenishing of the chamber with oil, and of further ensuring that such air scavenging takes place at a time when it will not interfere with the valve-lifting function of the hydraulic valve gear.

The top of the chamber 4 is recessed to form an air trap 6, and immediately therebeneath is an air bleed valve 7 mounted in a casing 8 in the lower wall of the said chamber 4, which wall is provided with a pressure oil feed manifold 9 from which a port 10 leads to the interior of the upper end of the said casing 8.

The said upper end of the casing 8 is formed with a valve seat 11 on which the head 12 of the bleed valve 7 seats, and also is provided with an internal bushing 13 on which seats a valve shoulder 14. The stem 15 of the valve extends freely through the bushing 13 and beyond the lower end of the casing 8, and 16 is a washer secured on the lower end of the said stem 15. 17 is a light compression spring arranged between this washer 16 and a check valve 18, which is slidable on the said stem 15 into seating engagement with the lower end of the said casing 8.

The bleed valve 7 has a passage 19 therein, the lower end of which opens to an annular port 20 in the casing 8 at the upper end of the bushing 13, and the upper end of the said passage 19 opens at the top of an extension 21 on the upper end of the bleed valve, this extension entering the air trap 6 of the actuator chamber 4.

In the position of the parts shown in Figure 1, the bleed valve is closed with its head 12 seating to prevent passage of oil from the manifold 9 to the chamber 4, and its shoulder 14 is seated to prevent escape of oil through the passage 19 from the said chamber 4. This condition exists while the engine valve 2 is being actuated by the operation of the plunger 3, as shown in Figure 1, and also while the valve 2 is closing under the influence of the valve spring 22, as will be readily understood, the oil in the chamber 4 being under heavy pressure during all of this time.

However, when the engine valve 2 is again seated, and pressure is no longer being exerted on the column of oil in the actuator chamber 4, the oil pressure in the oil manifold 9 becomes effective to unseat the bleed valve head 12, and incidentally the bleed valve shoulder 14, with a consequent raising of the bleed valve and the movement of the extension 21 thereof still further into the air trap 6 of the actuator chamber 4, whereupon, under the influence of said pressure oil in the manifold 9, any accumulated air in the trap 6 is forced from the chamber 4 through the bleed passage 19 and around the stem 15 of the bleed valve, forcing the valve 18 from its seat against the light resistance of the spring 17. After all the air is so scavenged from the chamber 4, it is followed by oil from the said chamber passing through the bleed valve and spilling past the check valve 18; a constant replenishing of oil in the chamber 4 being effected from the oil manifold 9 during the entire time that the said relief valve is open. Thus, an effective oil flow ensuring complete filling with oil of the actuator chamber 4 is secured following the actuation of the engine valve 2 by the actuator plunger 3, it being obvious that immediately pressure is again applied to the oil column in the chamber 4 by the plunger 3, in excess of pressure from the manifold 9 raising the check valve, the said check valve is reclosed and all flow from the chamber 4 immediately cut off.

It will be readily seen that the check valve 18 prevents an entirely free flow of oil from the chamber 4 such as might prevent a thorough filling of the chamber with oil, and prevents ingress of air through the bleed valve passages to the chamber 4 such as might prevent or render difficult the filling of the chamber with oil at low hand cranking speeds of the engine, such as after a long period of rest when leakage may have depleted oil in the said chamber to a considerable extent, which oil must, in hand cranking, be replaced at low speed pump operation.

From the foregoing description it will be seen that the air bleed valve 7, so generally referred to, comprises an air bleed valve proper formed by the valve shoulder 14 and a fluid supply valve formed by the head 12, although for the sake of simple connection these are shown in the illustrated example as parts of one mechanical unit.

The simplicity of the arrangement described is readily seen, and its automatic action renders it very desirable in connection with hydraulic valve gears of internal combustion engines for passenger vehicles, where a minimum of attention is to be desired and manual adjustments are usually to be avoided.

An arrangement of valve gear and cylinder head design, which lends itself well to the embodiment of the invention in manufacturing practice is shown in Figure 4, wherein the cylinder head structure 1' is bored transversely and in a somewhat downward direction at 4' to provide an actuator chamber to the lower end of which the stem of the engine valve 2 is exposed, the outer and upper end of the said chamber 4' being closed by a plug 23. The actuator plunger 3 is also exposed to the interior of a chamber 4' and is operated by the cam 5 in the same manner as already described with respect to the arrangement shown in Figure 1. Thereabove, the cylinder head structure has mounted therein an air bleed valve sleeve 8' between the lower end of which sleeve and the surrounding wall of the cylinder head structure a ferrule 24 is snared. This ferrule has openings 25 therein communicating with the high point or region of air accumulation in the said chamber 4', and it forms an abutment for the upper end of the plunger spring 26.

The sleeve 8', although inverted, functions in the manner of the sleeve 8 of Figure 1 similarly and houses an inverted air bleed valve 7' having at its lower end a head 12' formed to engage a seat 11' on the lower end of the said sleeve 8'. A head 12' of the valve 7' is recessed or concaved as at 6' to form the air trap proper of the actuator casing, and the passages 10' and 19' function in the same manner as the passages 10 and 19 of Figures 1 and 3 in providing oil circulation through the air bleed valve and incidentally air elimination when pressure on oil in the actuator chamber is relieved as heretofore described. 9' is a pressure oil manifold formed in the cylinder head structure to supply oil to the said passage 10'.

Also corresponding to the check valve 18 of Figure 1 is a check valve 18' seated on the upper end of the sleeve 8' by a spring 17 which is held in position by the washer 16 on the end of the air bleed valve stem. 27 is a retaining nut securing the said sleeve 8' in position in the cylinder head structure.

The said Figure 4 also illustrates a simple form of relief valve applied to the pressure oil manifold 9' to permit circulation therethrough at a predetermined pressure so that oil in the said manifold will, during the operation of the engine, have suitable pressure to ensure the air eliminating flow through the air bleed valve when it operates; and this relief valve is shown as comprising a cylinder 28 opening at its lower end to the said oil manifold 9' and having an outlet port 29 normally closed by sleeve 30 adapted to be raised by excessive pressure in the manifold 9' against the resistance of a tension spring 31. The said tension spring is simply secured at its upper end to a washer 32 resting on and enclosing the upper end of the said sleeve 30, and at its lower end to a pin 33 extending across the lower end of the cylinder 28. The ease with which this relief valve may be constructed and assembled will be quite apparent.

Oil spilled through the opening 29 may be returned to the source of oil supply, or otherwise disposed of in a desirable manner, the cylinder head structure being formed with a trough 34 for its reception.

35 is a cylinder head cover plate housing in the otherwise exposed end portions of the air bleed valve and relief valve mechanisms.

What we claim is:—

1. Means for bleeding air from a hydraulic fluid casing wherein fluid is subjected to pulsating pressure, comprising an outlet valve opening from a region of air accumulation in said casing, said valve being normally closed, a fluid supply manifold having a passageway to said casing, and valve-unseating means sensitive to pressure in the manifold in excess of that in said casing.

2. Means for bleeding air from a hydraulic fluid casing wherein fluid is subjected to pulsating pressure, comprising an outlet valve opening from a region of air accumulation in said casing, yielding means normally maintaining said valve seated, a fluid supply manifold having a passageway to said casing, and valve-unseating means sensitive to pressure in the manifold in excess of that in said casing.

3. Means for bleeding air from a hydraulic fluid casing wherein fluid is subjected to pulsating pressure, comprising an outlet valve opening from a region of air accumulation in said casing, said valve being normally closed, a fluid supply manifold having a passageway to said casing, and a member closing said passageway when pressure in said casing exceeds that in said manifold and movable to a passage disclosing position by excess pressure in said manifold, said member being connected to said outlet valve whereby the unseating of said valve is effected by the passage disclosing movement of said member.

4. Means for bleeding air from a hydraulic fluid casing wherein fluid is subjected to pulsating pressure, comprising a valve opening to the interior of said casing, fluid supply means adapted to open said valve during periods of low pressure in said casing whereby fluid is admitted to said casing, and an air bleed valve opening with said first mentioned valve and having an air bleed passage leading from a region of air accumulation in said casing.

5. Means for bleeding air from a hydraulic fluid casing wherein fluid is subjected to pulsating pressure, comprising a valve opening to the interior of said casing, fluid supply means adapted to open said valve during periods of low pressure in said casing whereby fluid is admitted to said casing, and an air bleed valve opening with said first mentioned valve and having an air bleed passage leading from a region of air accumulation in said casing, and means ensuring the closing of said valves when pressure in said casing exceeds the predetermined degree.

6. Means for bleeding air from a hydraulic fluid casing wherein fluid is subjected to pulsating pressure, comprising inlet and outlet valves normally closing inlet and outlet passages to and from said casing, said valves being connected for simultaneous operation, said outlet passage leading from a point of air accumulation in said casing, and fluid supply means from which said inlet passage extends, said inlet valve being adapted to be unseated by pressure of fluid in said supply means in excess of that in said casing.

7. Means for bleeding air from a hydraulic fluid casing wherein fluid is subjected to pulsating pressure, comprising a fluid supply manifold having a passageway to said casing, an outlet valve from said casing, an inlet valve connected to said outlet valve for simultaneous operation therein, said inlet valve closing said passageway, and yielding means maintaining said valves seated, the resistance of said means to the unseating of said valves being adapted to be overcome by pressure of fluid in the said manifold in excess of that in said casing.

8. Means for bleeding air from a hydraulic fluid casing wherein fluid is subjected to pulsating pressure, comprising an outlet valve opening from a region of air accumulation in said casing, said valve being normally closed, a fluid supply manifold having a passageway to said casing,—valve-unseating means sensitive to pressure in the manifold in excess of that in said casing, and a relief valve on said manifold limiting the maximum pressure therein.

9. Means for bleeding air from a hydraulic fluid casing wherein fluid is subjected to pulsating pressure, comprising an outlet valve opening from a region of air accumulation in said casing, said valve being normally closed, a fluid supply manifold having a passageway to said casing,—valve-unseating means sensitive to pressure in the manifold in excess of that in said casing, and means obstructing free flow from said outlet valve to limit the minimum pressure in said casing when said outlet valve is open.

10. Means for bleeding air from a hydraulic fluid casing wherein fluid is subjected to pulsating pressure, comprising an outlet valve opening from a region of air accumulation in said casing, said valve being normally closed, a fluid supply manifold having a passageway to said casing,—valve-unseating means sensitive to pressure in the manifold in excess of that in said casing, means obstructing free flow from said outlet valve to limit the minimum pressure in said casing when said outlet valve is open, and a relief valve on said manifold limiting the maximum pressure in said manifold.

11. Means for bleeding air from a hydraulic fluid casing wherein fluid is subjected to pulsating pressure, comprising an outlet valve opening from a region of air accumulation in said casing, said valve being normally closed, a fluid supply manifold having a passageway to said casing, valve-unseating means sensitive to pressure in the manifold in excess of that in said casing, and a check valve yieldingly resisting flow from said outlet valve.

12. In a hydraulic valve actuating means the combination with a puppet valve stem of a hydraulic fluid casing to the interior of which the said valve is exposed for operation by incompressible fluid in said head, said head having an air bleed outlet therefrom, means imposing impulses on fluid in said head whereby said puppet valve is actuated, an air bleed valve normally closing said outlet, a fluid supply manifold having a passageway to said casing, and an air bleed valve unseating means sensitive to pressure in the manifold in excess of that in said casing.

13. In combination, a cylinder head structure chambered to provide a hydraulic fluid casing therein and including a fluid manifold having a passageway to said casing, a puppet valve having its stem exposed to the interior of said casing, timed mechanism imposing impulses on fluid in said casing whereby said valve is actuated, yielding means seating said valve, an air bleed valve mounted in said head structure and opening from a region of air accumulation in said casing, and an air bleed valve unseating means sensitive to pressure in said manifold in excess of that in said casing.

14. In combination, a cylinder head structure chambered to provide a hydraulic fluid casing therein and including a fluid manifold having a passageway to said casing, a puppet valve having its stem exposed to the interior of said casing, timed mechanism imposing impulses on fluid in said casing whereby said valve is actuated, yielding means seating said valve, an air bleed valve mounted in said head structure and opening from a region of air accumulation in said casing, a member closing said passageway when pressure in said casing exceeds that in said manifold and movable to a passage-disclosing position by excess pressure in said manifold, said member being connected to said air bleed valve whereby the unseating of said air bleed valve is effected by the passage-disclosing movement of said member.

15. In combination, a cylinder head structure chambered to provide a hydraulic fluid casing therein and including a fluid manifold having a passageway to said casing, a puppet valve having its stem exposed to the interior of said casing, timed mechanism housed in said structure, said timed mechanism imposing impulses on fluid in said casing whereby said valve is actuated, yielding means seating said valve, an air bleed valve mounted in said head structure and opening from a region of air accumulation in said casing, and an air bleed valve unseating means sensitive to pressure in said manifold in excess of that in said casing.

16. In combination with a cylinder head structure of an internal combustion engine, an actuator housing forming an upper structure of said cylinder head structure, puppet valves having their stems entering said actuator housing, said housing being chambered to provide an actuator chamber for each of said valves, to the interior of which chambers stems of said valves are exposed, timed mechanism housed in said head structure imposing impulses on fluid in said chambers whereby said valves are actuated, a fluid manifold in said head, non-return means supplying fluid from said manifold to said chambers, said chambers having fluid relief passages therefrom, and timed means within the said head structure closing the relief passage of each chamber during activity of its impulse imposing mechanism.

17. In combination with a cylinder head structure, an upper structure forming a valve actuator housing, puppet valves having their stems extending upwardly into said housing, a camshaft in said head structure, plungers operated by said camshaft extending into said housing, said housing being chambered to provide connecting chambers between the ends of said valve stems and said plungers, said head structure being further chambered to provide a hydraulic fluid manifold supplying fluid to said chambers, and closable relief valves opening from regions of air accumulation in said chambers.

18. In an engine, a detachable cylinder head unit comprising, in combination, a cylinder head structure, a camshaft chamber extending longitudinally thereof, an oil manifold extending longitudinally thereof, valve actuator chambers extending transversely thereof, puppet valves having their stems extending upwardly to said actuator chambers, actuator members disposed between said camshaft and said actuator chambers, their operation by said camshaft providing impulses on hydraulic fluid in said actuator chambers whereby said valves are actuated, walled passages between said oil manifold and said actuator chambers, means closing the passage to each of said actuator chambers during periods of respective valve actuation, walled relief passages from said actuator chambers and means closing said relief passages during periods of respective valve actuation.

In testimony whereof we affix our signatures.

WARREN NOBLE.
LEON V. PITTMAN.